US005508512A

United States Patent [19]

Gray et al.

[11] Patent Number: 5,508,512

[45] Date of Patent: Apr. 16, 1996

[54] SORTING MACHINE USING DUAL FREQUENCY OPTICAL DETECTORS

[75] Inventors: Calvin G. Gray, Houston; Jeffery S. Pawley, Sugarland, both of Tex.

[73] Assignee: ESM International Inc., Houston, Tex.

[21] Appl. No.: 377,451

[22] Filed: Jan. 24, 1995

[51] Int. Cl.[6] .............................. B07C 5/342; G01J 3/50; G01N 21/27

[52] U.S. Cl. .......................... 250/226; 250/224; 209/580; 356/425

[58] Field of Search ................................ 250/226, 214.1, 250/214 R, 223 R, 224, 222.1, 338.4, 339.01, 339.05, 339.11, 339.12, 343, 344; 209/552, 556, 558, 576, 577, 580, 581, 582; 356/419, 416, 425, 435, 434

[56] References Cited

U.S. PATENT DOCUMENTS

| | | | |
|---|---|---|---|
| 3,962,578 | 6/1976 | Roschen | 250/226 |
| 4,095,696 | 6/1978 | Sherwood | 209/558 |
| 4,096,388 | 6/1978 | Wong . | |
| 4,105,123 | 8/1978 | Irving et al. | 209/566 |
| 4,106,628 | 8/1978 | Warkentin et al. | 209/556 |
| 4,281,933 | 8/1981 | Houston et al. | 356/425 |
| 4,651,001 | 3/1987 | Harada et al. | 250/330 |
| 5,062,532 | 11/1991 | Zivley . | |
| 5,124,553 | 6/1992 | Hilliard et al. | 250/344 |
| 5,129,726 | 7/1992 | Nielsen . | |
| 5,265,732 | 11/1993 | Long . | |

FOREIGN PATENT DOCUMENTS

| | | |
|---|---|---|
| 1067725 | 5/1967 | United Kingdom . |

OTHER PUBLICATIONS

Infrared Detectors 1994, p. 8 entitled "J16Si Series Silicon/Germanium 'Sandwich' Detectors", EG&G Judson, Copyright 1993.

*Primary Examiner*—Edward P. Westin
*Assistant Examiner*—John R. Lee
*Attorney, Agent, or Firm*—Vaden, Eickenroht, Thompson & Feather

[57] ABSTRACT

A photo-optical detector for use in a multichromatic sorting machine, each detector including at least two separate photodiode materials responsive to a different spectral range and a multipeak optical filter having transmission response characteristics that are respectively defined in a frequency spectrum of the respective spectral ranges of the materials. The sorting machine using such detectors can be selectively programmed using the various resulting signals from the detectors after appropriate amplification and threshold detection to cause resulting ejection mechanism activation.

6 Claims, 4 Drawing Sheets

SORTING MACHINE USING DUAL FREQUENCY OPTICAL DETECTORS

BACKGROUND OF THE INVENTION

1. Field of the Invention

This invention pertains to sorting machines that optically sort or separate nonstandard fungible objects from standard objects as they pass a viewing station by viewing such objects in at least two different frequency spectrums and particularly to such sorting machines utilizing detector elements comprised of two or more different photo-sensitive devices.

2. Description of Prior Art

A typical sorting machine of the type utilizing the present invention can be either a gravity-fed channel sorting machine or a belt sorting machine that passes a stream of objects or products to be sorted through an optical viewing station. Typically, the stream is comprised of standard fungible agricultural products, such as coffee beans, tomatoes or the like that are known to be of a standard hue or color in at least two bands of the frequency spectrum. However, if a product is overripe, bruised, or of a different grade from standard, it will have a non-standard hue or color in at least one of the two bands for which the standard products have a known standard hue or color. Such nonstandard products can be detected and removed or ejected from the stream by optical devices positioned vis-a-vis a viewing station through which the product stream passes. A sorting machine may have a plurality of parallel channels or paths, each with its own optical viewing station. Moreover, each optical viewing station can have more than one optical sensing device. For example, it is desirable to view the products or objects from different angles so that a spot hidden from view when viewed at a first angle will not be hidden from view when viewed at a second or third angle. However, for purposes of simplicity, each channel or path product stream can be considered as a continuous movement of singulated products that pass by a simplified optical viewing station.

An optical viewing station includes one or more lights to illuminate the products in the stream. An illuminated product reflects light and other frequencies, which are sensed by properly positioned photosensitive devices for monitoring the predetermined standard frequency spectrums discussed above. When a reflection is detected as being below a predetermined threshold value in one of the predetermined standard frequency spectrums, an ejection device, such as a strategically located air jet or a mechanical ejection finger is enabled and subsequently activated when the nonstandard product is positioned opposite the ejection device.

Alternative to the above operation, the detector can be adjusted to operate the ejector when a reflection deemed to be nonstandard is above a predetermined threshold value in one of the predetermined standard frequency spectrums. In such case, standard products would be passed since their reflections would be below the threshold values.

It is common in the prior art to use multiple photo or optical detectors for each spectrum, one for each pixel or photo site in a grid of a viewing window. One such system as this is disclosed in U.S. Pat. No. 5,062,532, issued Nov. 5, 1991 in the name of George A. Zivley, which patent is commonly assigned. The RL0256K array of photodiodes made by EG&G Reticon is suggested in the '532 patent for implementing the invention therein disclosed. However, the exemplar photodiodes of this array are wide aperture linear devices used in monochromatic or one frequency spectrum sorting. The invention described in the '532 is not limited to monochromatic sorting, but it is apparent that if bichromatic sorting was involved, first and second arrays with photodiodes tuned to the respective frequency spectrums would have to be physically separated from each other, thereby complicating the ejection firing to distinguish which array was involved in a substandard product detection. Moreover, the sources of illumination of the viewing station would have to be more numerous.

U.S. Pat. No. 5,265,732, issued Nov. 30, 1993 in the name of William C. Long, which patent also is commonly assigned, utilizes a detector that permits the detection of multiple spectrums at a single location. Shown therein is a prior art scheme utilizing a beam splitter and two filters, one for each of the two frequency spectrums used in the sorting. The patent also reveals the use of narrow band lights for illuminating the products in the product stream, rather than ordinary wide band general illumination bulbs. In such scheme, either a beam splitter and appropriate filters are used with the light sources or the light sources are shown at different angles, with appropriate filters still being required. In all events, the schemes utilize many different and complex optical devices and space requirements to implement such a scheme are a prime consideration.

Therefore, it is a feature of the present invention to provide an improved photo-optical detector for use in a sorting machine having a sandwich of at least a first and second photosensitive material that pass a composite multipeak frequency spectrum with a single multipeak optical filter (or a set of multiple optical components) in front of the sandwich for passing at least two defined light frequency spectrums, one within the wide frequency sensitivity of the first photosensitive material and the other within the wide frequency sensitivity of the second photosensitive material.

It is another feature of the present invention to provide an improved photo-optical detector of the type described above in which a first photosensitive material is silicon and a second photosensitive material is germanium.

It is still another feature of the present invention to provide a sorting machine utilizing a sandwich detector of the type generally described above that also includes electronic processor means such as a microprocessor for developing a signal for each separate device of the sandwich or, alternatively, a signal when there is a selected combination of signals from the separate devices so that ejection of a nonstandard product can be made on the existence of a single device signal or one or more selected signal combinations.

It is yet another feature of the present invention to provide an improved photo-optical detector of the type generally described above utilizing a sandwich of multiple photosensitive materials.

It is still another feature of the present invention to provide a sorting machine utilizing a sandwich photo-optical detector having more than two material devices, a filter having more than two defined light frequency spectral sensitivities, and electronic processor means for selecting one or more combinations of signals from the various devices for activating an ejector to remove nonstandard products from a product stream being sorted.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary preferred embodiments thereof which are illustrated in the appended drawings, which form a part of this specification. It is to be noted, however, that the drawings illustrate only typical preferred embodiments of the invention and are therefore not to be considered limiting of its scope as the invention may admit to other equally effective embodiments.

In the drawings.

DESCRIPTION OF THE PREFERRED EMBODIMENTS

Figure 1:
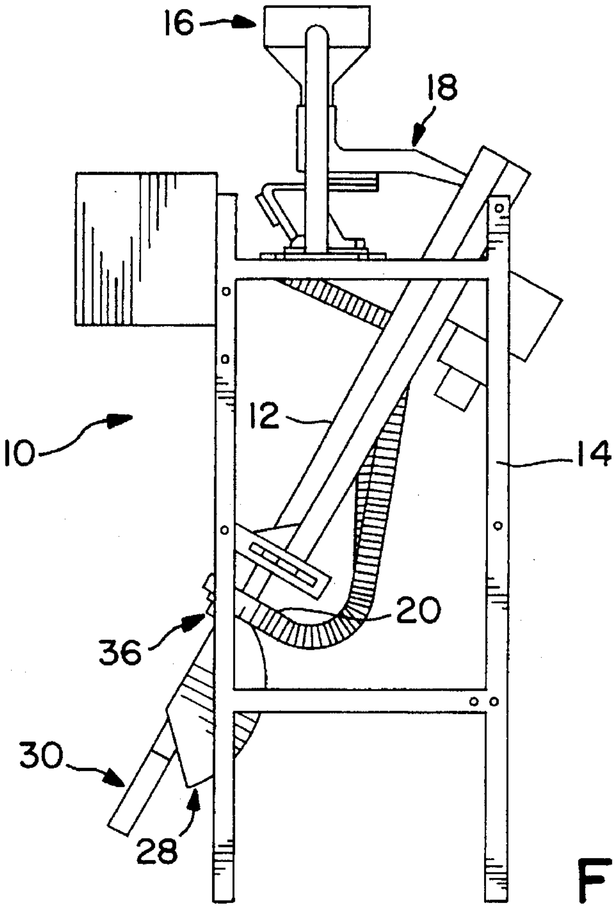
FIG. 1 is a side view of an electro-optical sorting machine incorporating the sandwich detectors and electrical processing means in accordance with the present invention.

Now referring to the drawings, and first to FIG. 1, a high speed sorter for separating nonstandard fungible products or items from a passing stream or flow of such products is shown. Generally, machine 10 includes one or more channels or chutes or slides 12 at a steep angle, usually over 45° and preferably nearly vertical on the order of 80°. The channels are held in position by a framework 14 and are gravity fed the product to be sorted at the top by a hopper 16 attached to the same framework. The product feeds from hopper 16 through dividing vibratory feeder 18 to channels 12. Although a commercial machine usually has two or more channels 12 operating simultaneously with respect to the products that flow respectively through them, for simplicity of discussion, machine 10 is discussed hereinafter as including only a single channel 12.

Moreover, a belt sorter having one or more paths for the product machine can be employed using the invention, if desired. Such a machine has a moving horizontal belt onto which the products are to be sorted or deposited, the belt moving through an optical viewing station in much the same manner as a channel sorter.

The products to be separated or sorted by machine 10 are small fungible items, such as coffee beans. Coffee beans, it will be appreciated, are individually identifiable by color in one or more spectral bands. The feed from the hopper via the vibratory feeder and down the channel is all by gravity action. The flow of the products is only slowed from free fall by the friction caused by the bends and the surfaces of the path. The products do move, however, at a fast rate and in large quantity, as is well known in the art.

An optical viewer or sensor 20, described more fully below, is located toward the bottom part of the channel. As the flow of products passes past the sensor, nonstandard or substandard products are sensed or detected. It will be appreciated that such sensing or detection requires the substandard products to be distinguished both from the standard products and the background. Typically a substandard item, such as a coffee bean, is detectable on the basis of its being darker or lighter or of a different color or hue from an acceptable range of darkness, lightness or color predetermined for standard or acceptable items. This sensing can be in a single spectral range for monochromatic detection, in two separated spectral ranges for bichromatic detection, or in a plurality of spectral ranges for multichromatic detection. It is understood that a "spectral range" can be wholly or partially in the visual spectrum or can be wholly or partially in the nonvisual spectrum. For example, sensing in the infrared range is commonly done. When a substandard product or item is sensed, an electrical signal is produced that results in an ejection of the substandard item by the actuation of an ejector mechanism.

An ejector 36 located underneath and adjacent optical sensor means 20 is actuated by the actuation electrical signal just mentioned to produce an air blast to remove the unwanted substandard product from the flow of products in the product stream. The ejector can be a mechanical ejector, if desired. When the actuation signal occurs, typically, a solenoid valve is operated to release or emit an air blast at the product stream to timely remove the substandard item. The delay in actuation is very short following the time of sensing, the timing being such to produce the desired expelling of the detected substandard item and is accomplished in a manner well known in the art. The items thus removed in the process fall down into reject accumulator 28 for subsequent disposal. The items not removed continue down channel extension 30 to be gathered or packaged as quality products passing the preset standards and avoiding removal. The control of the flow and the sensitivity of the sensors are controlled by preset controls that are well-known in the art.

Figure 2:
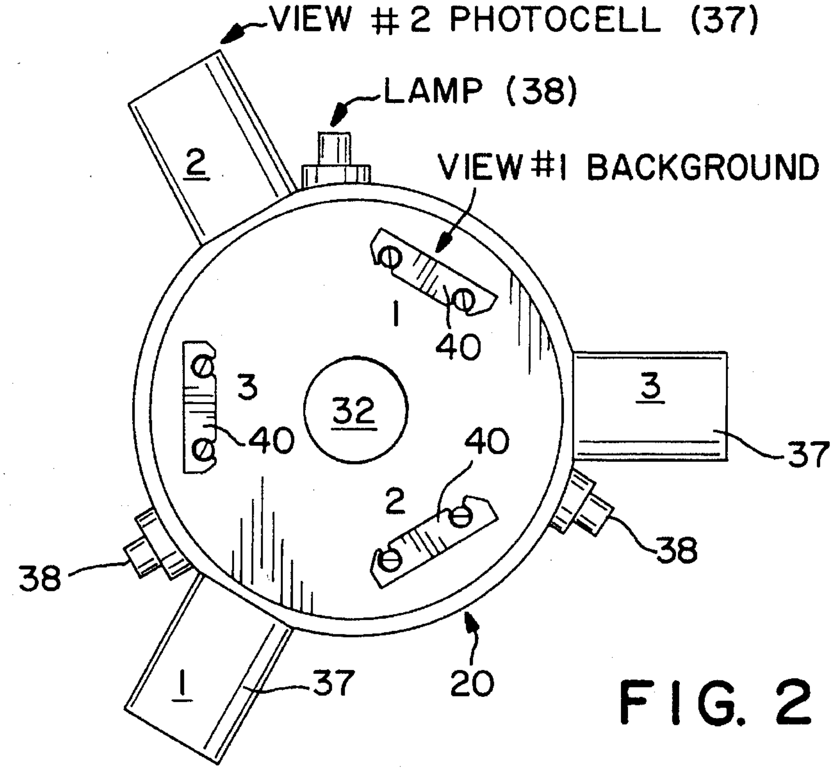
FIG. 2 is a top view of an optical viewing station of an electro-optical sorting machine, such as shown in FIG. 1.

Now referring to FIG. 2, the viewing or optical sensor and related components of the machine are illustrated as seen from above. Sensor means 20 generally is a ring-like structure with a center opening 32, the flow of the products to be separated or sorted as discussed above passing through the opening at a "window" location or plane. This is the electro-optical viewing station for the machine. The optical or viewing mechanism is well-known and generally includes three evenly, peripherally spaced individual sensors 37, which include a photocell, photodiode, or other photo-optical detector. At least three lamps 38 are included in the plane, one for each individual sensor. Each lamp 38 projects a beam against a separate background plate 40, the reflection therefrom and from any products flowing between the background plate and the photocell sensor being detected by the sensor. The reason that three sensors are employed is to ensure sensing a substandard item that is detectable from only one direction and not necessarily from another direction. Only one lamp 38 is shown for each viewing combination of photocell sensor 37 and background plate 40. In actual practice, there are usually multiple lamps 38 for illuminating the product stream uniformly and the same or additional multiple lamps for illuminating the background plate uniformly.

Figure 3:
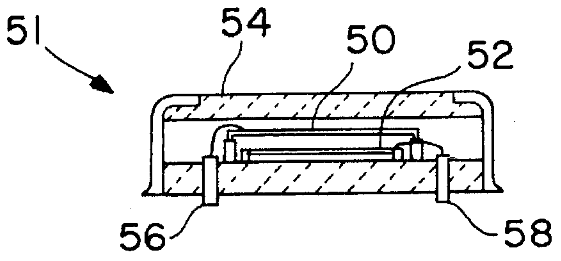
FIG. 3 is a cross-sectional side view of a sandwich detector in accordance with the present invention.

FIG. 3 illustrates a J16 Si Series silicon/germanium "sandwich" detector 51 manufactured by EG&E Judson of Montgomeryville, Pa. Of course, any other two or more element device having responsive semiconductor materials similar to such a device can be employed. This two-color detector consists of a high performance silicon photodiode device 50 mounted in a "sandwich" configuration over a germanium photodiode device 52. It will be seen that radiation enters window 54 to cause a nominal response in silicon device 50 at 800 nm. Longer wavelengths of the radiation pass through the silicon material and cause a nominal response in germanium device 52 at 1300 nm. Actually, the responsivity of the two devices is more accurately portrayed in FIG. 5, each device being somewhat broadband over a spectrum of frequencies.

The J16 Si Series detector has been employed in fiber optic power measurements and in two-color temperature sensing applications. The manufacturer states that each silicon device or element and the germanium device or elements requires a preamplifier in practice, which are respectively connected to terminals 56 and 58.

Figure 4:
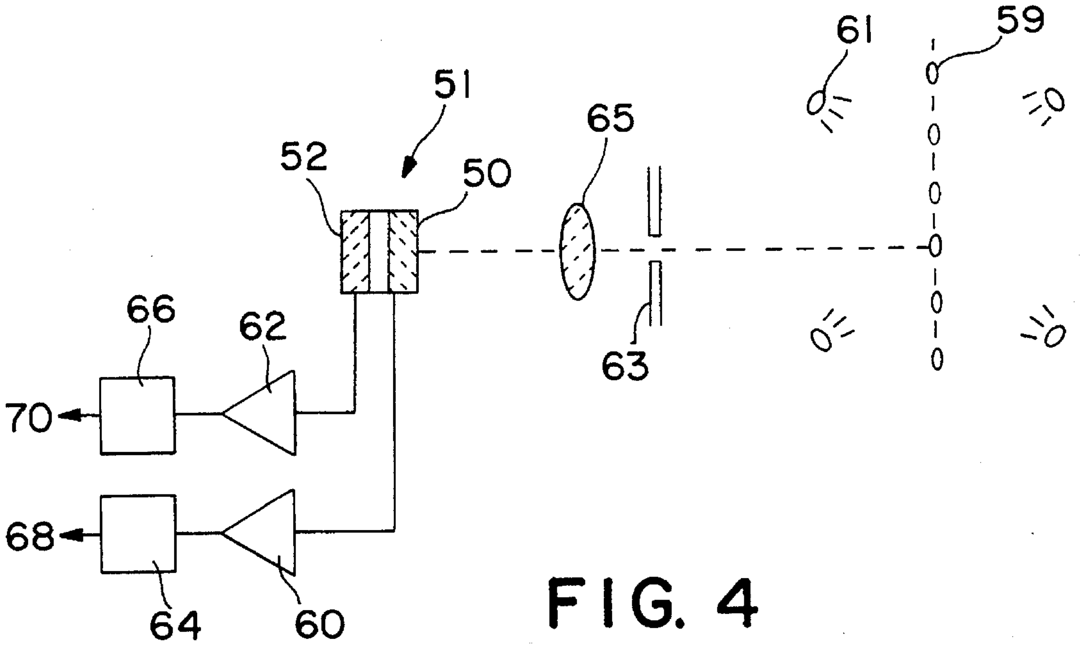
FIG. 4 is a schematic diagrammatic representation of a simplified version of sorting activity in accordance with the present invention.
Figure 5:
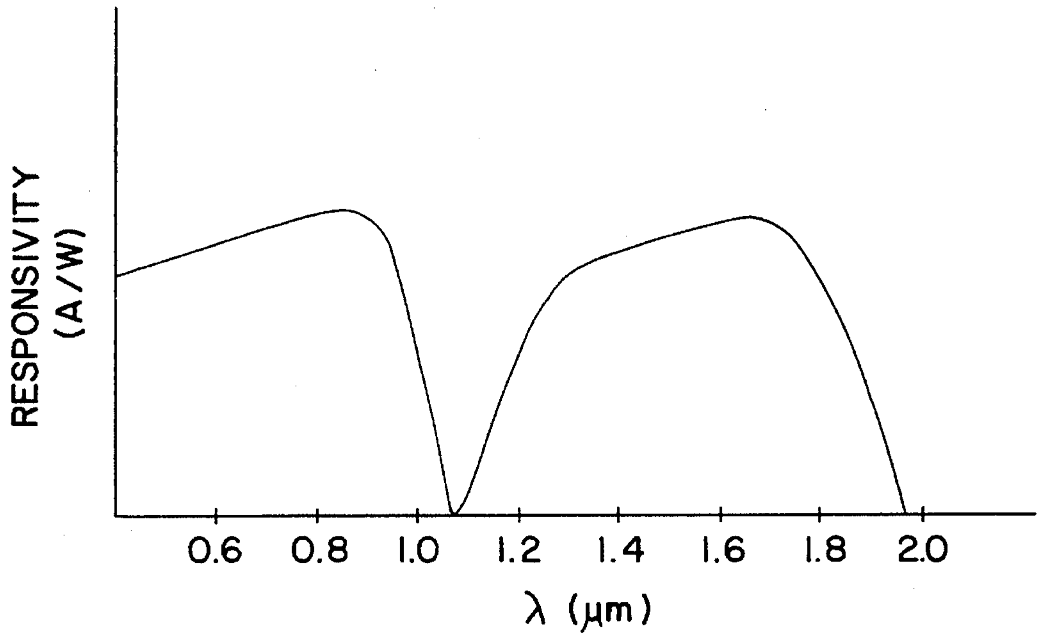
FIG. 5 is a typical responsivity illustration for the sandwich detector shown in FIG. 3.
Figure 6:
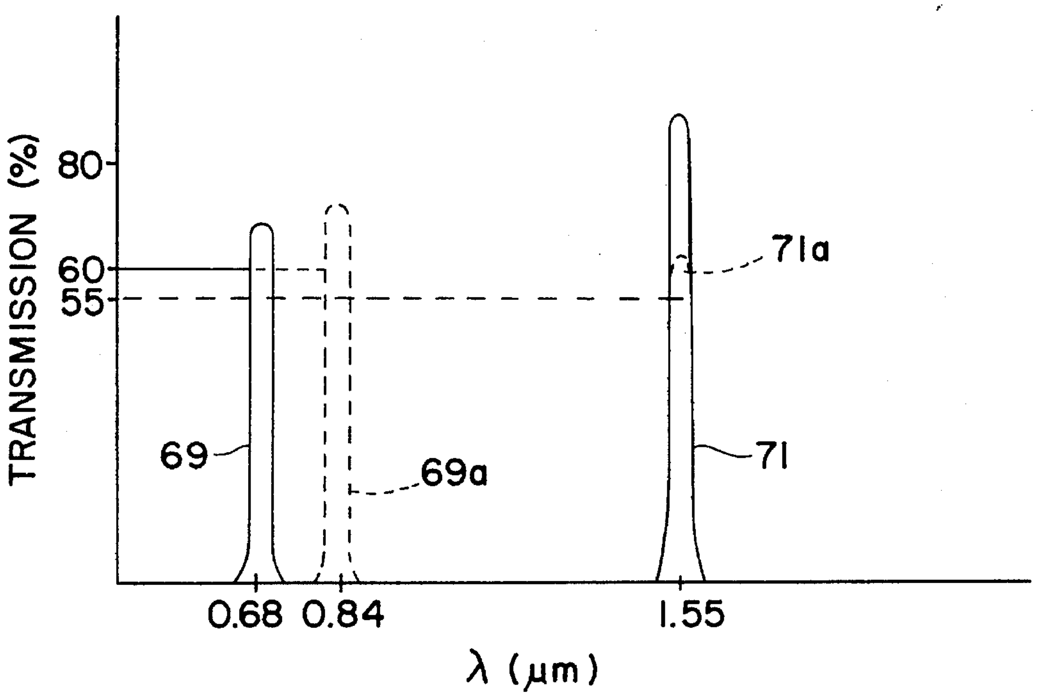
FIG. 6 is a transmission illustration for the multipeak optical filters employed in the present invention.

A very simplified schematic representation of the essential parts of the invention are shown in FIG. 4. Products 59 pass through the optical viewing station and are illuminated by one or more light sources 61. Typically, a light source is a wide band incandescent or fluorescent light. Radiation reflections from the products pass through a viewing window 63 to be received by a twin peak optical filter 65 placed in front of sandwich detector 51. Optical filter 65 has transmission properties such as shown in FIG. 6, wherein the percentage of transmission is defined at two peaks, namely, peak 69, centered at 0.68 nm (600 nm) and peak 71 centered at 1.55 nm (1550 nm). The first of these peaks is located in the broad spectral response range of silicon device 50, as shown in FIG. 5 and the second of these peaks is located in the broad spectral response range of germanium device 52. The transmission response peaks are not normally the same value, although they could be.

Returning to FIG. 4, device 50 is connected to a preamplifier/amplifier 60 and device 52 is connected to a preamplifier/amplifier 62 to produce the outputs that are then subjected to threshold detection in threshold detectors 64 and 66, respectively. Since the transmission response peaks are not necessarily the same, the threshold detection levels can be set at different levels, as shown in FIG. 6. That is, the level may be set at a nominal value of 60 for the first peak that has a lower peak than the second peak, while the threshold level may be set at 80 for the second peak.

In operation, an effective signal 68 is produced from detector 64 when a classifier interpreter means determines that a threshold level has been exceeded by the input to detector 64 and an effective signal 70 is produced from detector 66 when a classifier interpretation means determines that a threshold level has been exceeded by the input to detector 66. Actually, the classifier interpretation means typically is located in a subsequent microprocessor, but the threshold level development and signal production scheme can best be understood from the just described functional operation of FIG. 4.

Signals 68 and 70 are utilized in a suitable electronic processing means, typically a microprocessor, to result in an eventual ejection activation signal as previously discussed and which is well known in the art. Perhaps the most simple logic operation of such a processing means is to cause an ejection activation signal when either signal 68 or 70 is produced. However, the logic can be established to cause an ejection signal only when both signals are present.

Figure 7:
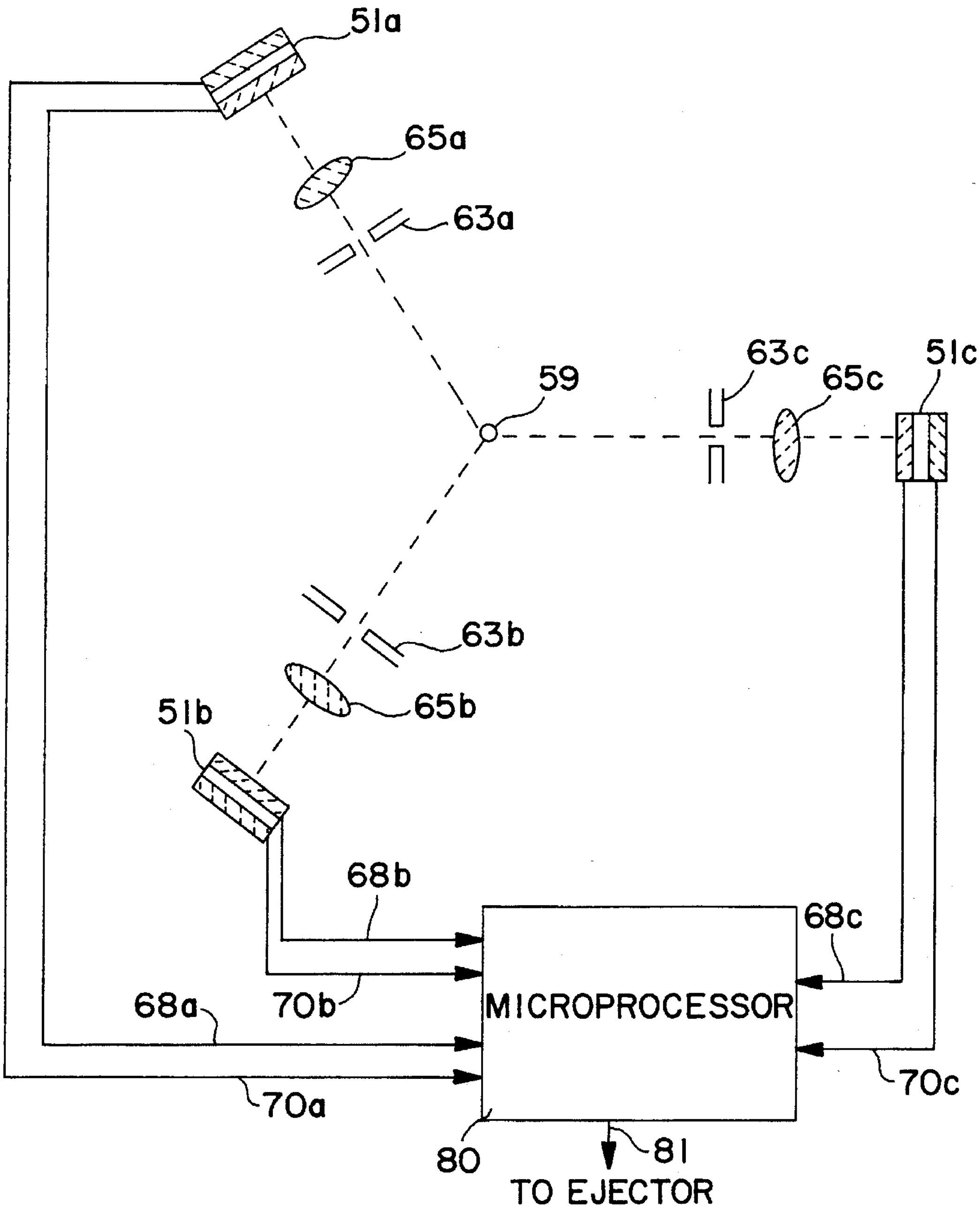
FIG. 7 is a diagrammatic representation of multiple sandwich detectors and multipeak optical filters in accordance with the present invention.

As previously mentioned, it is common to view the product stream from multiple angles, such as diagrammatically illustrated in FIG. 7. In this diagram, three sandwich detectors 51 are located at 120° positions with respect to the product stream when viewed from the top. Each detector 51*a*, 5l*b* and 51*c* are associated with similar related components, such as discussed in connection with FIG. 4, although not all components are shown in FIG. 7. In any event, six inputs are applied to microprocessor 80, namely, inputs 68*a* and 70*a* from detector 51*a*, inputs 68*b* and 70*b* from detector 5l*b*, and inputs 68*c* and 70*c* from detector 51*c*. The microprocessor can be programmed to result in an ejection signal 81 when any one of the six inputs are present or any combination of the six inputs are present.

A further possibility for more color discrimination is available when one or more of the optical filters 65*a*, 65*b* and 65*c* have different peak transmission properties. For example, as shown in FIG. 6, one optical filter can have the properties previously discussed, namely with peaks 69 and 71, while another optical filter can have a peak 69*a* centered at 0.84 nm (840 nm). Also, the threshold level of operation can be different for such peak, as previously discussed. Moreover, such a filter can have a second peak at the same or different location from peak 71, such as 71*a*, but its transmission response may be different from that of peak 71, which would call for a different level of threshold operation.

Thus, each angle of viewing may have different frequency response signals resulting therefrom or the same. If more than one detector 51 and related components are located at each angle of viewing, then additional color discrimination operation can be selected in the manner previously discussed.

Further additional optional embodiments can be chosen by using detectors 51 having more than two semiconductors with general responsivity spectral ranges different from one another and using optical filters 65 having more than two peaks. However, the general principles of operation are applicable as discussed above even though the combinations available are more complex. Thus, while several embodiments have been discussed and other embodiments have been generally described, it is understood that the invention is not limited thereto, since many modifications may be made and will become apparent to those skilled in the art.

What is claimed is:

1. An optical sorting machine having an optical viewing station through which a stream of viewed products pass to be sorted using a plurality of defined light frequency spectrums, comprising:

illumination means for brightly illuminating the product stream in the optical viewing station over a broadband light spectrum;

a plurality of photo-optical detectors positioned for receiving reflected light from the viewed products, the reflectivity respectively varying over the broadband light spectrum dependent on the respective color of the viewed products, each of said plurality of photo-optical detectors including a first photo-sensitive device responsive to a first color frequency spectrum in a broadband light radiation signal, said first photo-sensitive device allowing at least partial passthrough of the broadband light radiation signal of longer wavelengths, and being substantially unresponsive to the longer wavelengths, a second photo-sensitive device sandwiched behind and optically aligned with said first photo-sensitive device, responsive to a second frequency color spectrum longer in wavelength than the first frequency spectrum, and a multiple peak optical filter in front of said photo-sensitive devices for passing a first defined light frequency spectrum within said first color frequency spectrum and a second defined light frequency spectrum within said second color frequency spectrum, said first photo-sensitive device producing an output which is proportional to the light radiation in the first defined light frequency spectrum, said second photo-sensitive device producing an output which is proportional to the light radiation in the second defined light frequency spectrum; and an electronic processing means connected to said photo-optical detectors for producing an ejection signal as determined by the presence of at least one predetermined combination of first and second device outputs.

2. An optical sorting machine in accordance with claim 1, wherein said first and second defined light frequency spectrums are the same for each photo-optical detector.

3. An optical sorting machine in accordance with claim 1, wherein said first and second defined light frequency spectrums are not the same for each photo-optical detector.

4. An optical sorting machine having an optical viewing station through which a stream of viewed products pass to be sorted using a plurality of defined light frequency spectrums, comprising:

illumination means for brightly illuminating the product stream in the optical viewing station over a broadband light spectrum;

a plurality of photo-optical detectors positioned for receiving reflected light from the viewed products, the reflectivity respectively varying over the broadband light spectrum dependent on the respective color of the viewed products, each of said plurality of photo-optical detectors including a silicon device responsive to a first color frequency spectrum in a broadband light radiation signal, said silicon device allowing at least partial passthrough of the broadband light radiation signal, a germanium device sandwiched behind and optically aligned with said silicon device responsive to a second frequency color spectrum longer in wavelength than the first frequency spectrum, and a twin peak optical filter in front of said silicon device for passing a first defined light frequency spectrum within said first color frequency spectrum and a second defined light frequency spectrum within said second color frequency spectrum, said silicon device producing an X output proportional to the light reflected from the product in the first defined light frequency spectrum, said germanium device producing a Y output proportional to the light reflected from the product in the second defined light frequency spectrum; and a microprocessor connected to said photo-optical detectors for producing an ejection signal as determined by the amount of at least one predetermined combination of X and Y outputs.

5. An optical sorting machine in accordance with claim 4, wherein said first and second defined light frequency spectrums are the same for each photo-optical detector.

6. An optical sorting machine in accordance with claim 4, wherein said first and second defined light frequency spectrums are not the same for each photo-optical detector.

* * * * *